Patented Oct. 8, 1940

2,217,451

UNITED STATES PATENT OFFICE 2,217,451

PROCESS OF TREATING THERMOPLASTIC MATERIALS

Winton I. Patnode, Schenectady, N. Y., assignor to General Electric Company, a corporation of New York No Drawing. Application March 1, 1938, Serial No. 193,365

1 Claim. (Cl. 18—59)

The present invention relates generally to a process of treating thermoplastic resinous material having as its main object the prevention of subsequent cracking or breaking of the material at elevated temperatures.

Certain thermoplastic resinous insulation materials, of which plasticized polyvinyl chloride is representative, exhibit a phenomenon which may be described as "cracking," that is splitting whenever they are heated at an elevated temperature, say 150° C., while under mechanical stress, for instance such stress as is present at a bend in the material on a wire. It will be apparent that such cracking is highly objectionable and would prevent the use of such material as insulation on a conductor as part of any apparatus which requires baking at high temperature.

The process by which thermoplastic insulating compositions, such as plasticized polyvinyl chloride, is applied to wire is usually the extrusion of the hot, plastic mass with the aid of the conventional extrusion machine used in the rubber industry. In this process the wire is drawn through a die which applies a coating of the hot, plastic insulation. The insulated conductor then is cooled by being drawn through water and wound up on a reel, no curing process being required. Observation of this process shows that the composition is oriented in a direction parallel to the direction of extrusion and is, therefore, under mechanical tension on the wire in a direction parallel to the wire. When the mass is cooled, this tension is "frozen." Subsequent heating of the wire to a temperature at which the compound is mechanically weak allows this residual longitudinal tension together with any additional tension it may have received, for example in bending operations incident to the formation of a coil, to exert sufficient force to crack the insulation.

Stated in another way, it may be said that when a thermoplastic material such as, for example, plasticized polyvinyl chloride, polyvinyl acetate, polyisobutylene, polyethylacrylate, rubber hydrochloride, polystyrene and the like, is mechanically distorted, a restoring force is generated which may or may not restore the material to its original shape depending upon the time-temperature relationship involved. If the deformation is rapidly produced at an elevated temperature, it may be "frozen" or stored by quickly cooling the object to a low temperature; and the restoring force can "decay" if the article is held in the extended condition for a sufficiently long time at an elevated temperature.

Thus, in the insulation of a wire with plasticized polyvinyl chloride, for example, by extrusion of the composition on the wire, the material being oriented in a direction parallel to the axis of the wire, sets up restoring forces. These forces cannot restore the insulation to its original shape, nor do they have time to "decay" during the interval between the time the wire leaves the extrusion machine and the time it becomes cold. They are, therefore, stored in the insulation. If, therefore, the wire is subsequently further stretched, for example by winding into a coil, and then heated (e. g., when the coil is baked) the restoring forces are able to act, but since the conductor itself does not shrink, the forces exceed the tensile strength of the insulation which then cracks.

I have discovered that it is possible to overcome the foregoing difficulties by the subjection of the material to a heat treatment or annealing directly after it is mechanically distorted as when it is extruded, calendered, etc. In the case of wire insulated with such material, it is heated directly after it issues, for example from the extrusion machine to a sufficiently high temperature for the restoring forces to decay in a very short time. By doing this, I have found that subsequent cracking of the insulation may be entirely avoided. For example, if a sample of wire insulated with plasticized polyvinyl chloride which exhibits cracking is heated at a temperature of 220° C. for five minutes and then is cooled, it may subsequently be bent sharply and heated to 150° C. without cracking. Similarly, the insulated wire can be passed directly through a heated oven from the extrusion machine with the same results.

For example, plasticized polyvinyl chloride composition is extruded on a wire or core which has previously been preheated to about 200° F. The temperature of the composition extruding from the tubing machine runs from 325° F. to 350° F. As the insulation leaves the tubing machine die it passes directly into an annealing oven three feet in length, the heating or annealing zone in the oven being maintained at a temperature ranging from 700° F. to 900° F., depending upon the wire size. For example, #18 AWG $\tfrac{1}{32}$" wall of the insulation is extruded at 100 ft./min. with the annealing oven temperature at 750° F., while ⅙ AWG $\tfrac{5}{64}$" wall of the insulation is extruded at 35 ft./min. with the annealing oven temperature at 900° F. From the oven the insulated wire passes into a water bath for cooling, and is then taken up on a reel.

Obviously, the wire is not heated to the high temperatures maintained in the oven since the wire is continuously passing through it at a rate such that it is not within the oven very long, but it is heated to a sufficiently high temperature to give the desired effect in a relatively short period, say a few seconds, of time.

The term "annealing" as herein used differs from the anneal often used in metallurgical and ceramic work where the purpose of the annealing or heat treatment is to cool gradually from a high temperature to a low temperature. In the present invention the purpose is to heat the material to a higher temperature than that at which it was fabricated, for a very short time, and the rate of cooling is relatively unimportant. For example, in accordance with the present invention the heated insulated wire can be cooled by rapid chilling with water; such an anneal of, say, a ceramic body, would be disastrous. Moreover, in the present process the action is purely physical and involves no chemical reaction of the type which occurs in the "curing" of rubber.

What I claim as new and desire to secure by Letters Patent of the United States is:

The process which comprises preheating a conductor to about 200° F., extruding on said preheated conductor plastic plasticized polyvinyl chloride composition at a temperature of 325° to 350° F., directly passing the covered conductor through a zone maintained at a temperature between 700° to 900° F. at a rate sufficient to subject the plastic composition on the conductor for a few seconds to a temperature above the extrusion temperature and immediately cooling the covered conductor whereby the composition is restored to a stable state and subsequent cracking of the composition under stress at elevated temperature is eliminated.

WINTON I. PATNODE.